(12) United States Patent
Miller et al.

(10) Patent No.: US 8,771,136 B2
(45) Date of Patent: Jul. 8, 2014

(54) HYBRID POWERTRAIN WITH OPERATOR SELECTABLE ELECTRIC PROPULSION MODE

(75) Inventors: Michael Andrew Miller, Fenton, MI (US); Alan G. Holmes, Clarkston, MI (US); Brendan M. Conlon, Rochester Hills, MI (US); Steven A. Tarnowsky, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 413 days.

(21) Appl. No.: 13/157,346

(22) Filed: Jun. 10, 2011

(65) Prior Publication Data
US 2012/0312122 A1 Dec. 13, 2012

(51) Int. Cl.
*B60W 10/02* (2006.01)
(52) U.S. Cl.
USPC .............................................................. 477/5
(58) Field of Classification Search
USPC ............................................. 180/65.7; 477/5
See application file for complete search history.

(56) References Cited

U.S. PATENT DOCUMENTS

| 6,492,785 B1* | 12/2002 | Kasten et al. | 318/434 |
| 7,285,072 B2* | 10/2007 | Williams | 477/108 |
| 2008/0234915 A1* | 9/2008 | Nomasa et al. | 701/102 |
| 2009/0321155 A1* | 12/2009 | Vargas | 180/62 |

* cited by examiner

*Primary Examiner* — Dirk Wright
(74) *Attorney, Agent, or Firm* — Quinn Law Group, PLLC

(57) ABSTRACT

A powertrain for a vehicle includes an engine and a transmission having an input member, an output member, and a neutral state in which torque is not transmitted from the input member to the output member. A first motor/generator is coupled to the engine. A second motor/generator is coupled with vehicle wheels directly or indirectly through the transmission. The first motor/generator acts as a generator when powered by the engine to provide electric power to the second motor/generator. The second motor/generator acts as a motor when receiving electric power from a battery or from the first motor/generator. A shift selector is moved by a vehicle operator to establish an electric propulsion mode in which the transmission is in the neutral state and the second motor/generator functions as a motor.

20 Claims, 3 Drawing Sheets

HYBRID POWERTRAIN WITH OPERATOR SELECTABLE ELECTRIC PROPULSION MODE

TECHNICAL FIELD

The invention relates to a hybrid powertrain with an electric-only torque output mode.

BACKGROUND

Hybrid powertrains having electric motor/generators capable of providing electric propulsion are beneficial for their ability to reduce fuel consumption. During electric propulsion, all torque provided to the wheels is provided by a motor. A generator may receive power from the engine to supplement the electric power provided by the battery to the motor in an electric propulsion series operating mode. During electric propulsion, the engine is disconnected from the vehicle wheels.

SUMMARY

It would be beneficial to allow the vehicle operator to select an electric propulsion mode in a manual transmission or in an automatic transmission in order to maximize fuel economy. Because the engine is completely separated from the vehicle wheels in this mode, it is important that the operator's desire to select the electric propulsion mode be correctly determined by the powertrain. Furthermore, in the case of a manual transmission, the operator must be made aware of when operating conditions no longer warrant the electric propulsion mode, and a shift to another gear of the transmission is required.

Accordingly, a powertrain for a vehicle includes an engine and a transmission having an input member and an output member. The transmission is operable to provide a plurality of gear ratios between the input member and the output member, and is either a manual transmission with a selectively disengageable clutch between the engine and the input member or an automatic transmission with clutch engagement automatically controlled by a controller. The transmission has a neutral state in which torque is not transmitted from the transmission input member to the transmission output member.

The powertrain has two motors/generators to supplement propulsion capabilities of the conventional manual or automatic transmission. A first motor/generator has a rotor connected with the engine. The first motor/generator may be coupled directly or indirectly to the engine, replacing the starter motor, and may be used to start the engine, generate electricity, and assist in propulsion. A second motor/generator has a rotor connected with some of the vehicle wheels, such as the front or the rear vehicle wheels, either directly or indirectly through a gearing mechanism such as the transmission. The first motor/generator is selectively operable as a generator when powered by the engine to provide electric power to the second motor/generator. The second motor/generator is selectively operable as a motor when receiving electric power from an energy storage device or from the first motor/generator. The second motor/generator may also provide regenerative braking during deceleration. A motor controller is operable to cause the first and the second motor/generators to function as motors or as generators.

An operator shift selector enables a vehicle operator to place the powertrain in an electric propulsion mode, also referred to as an electric gear, in which the transmission is in the neutral state and the second motor/generator functions as a motor to provide propulsion power to the wheels. The electric propulsion mode establishes the neutral state of the transmission, thereby preventing the engine from propelling the vehicle, and also enables a series hybrid-like operation in which the engine powers the first motor/generator which functions as a generator to add electric power to the second motor/generator. Optionally, a shift indicator is operatively connected to the motor controller and provides an output signal indicative of a direction to shift the transmission to one of the gear ratios. In this way, the vehicle operator is alerted to shift into another gear ratio in the case of a manual transmission, or is alerted that the transmission has automatically shifted into another gear ratio in the case of an automatic transmission. In some embodiments, there is no physical shift indicator that provides an output signal; instead, by looking at a tachometer or listening to the engine, an operator will realize that the engine has come on and will then shift to one of the gear ratios.

The operator-selected electric propulsion mode is compatible with both manual and automatic transmissions, making it a cost-effective system for user-selectable electric propulsion capability with engine/generator reserve in the case of limited battery energy. When implemented in a manual transmission, the operator-selected electric propulsion mode could eliminate the need for launching the vehicle with a manually-activated clutch, thereby providing improved drivability.

The above features and advantages and other features and advantages of the present invention are readily apparent from the following detailed description of the best modes for carrying out the invention when taken in connection with the accompanying drawings.

DETAILED DESCRIPTION

Figure 1:
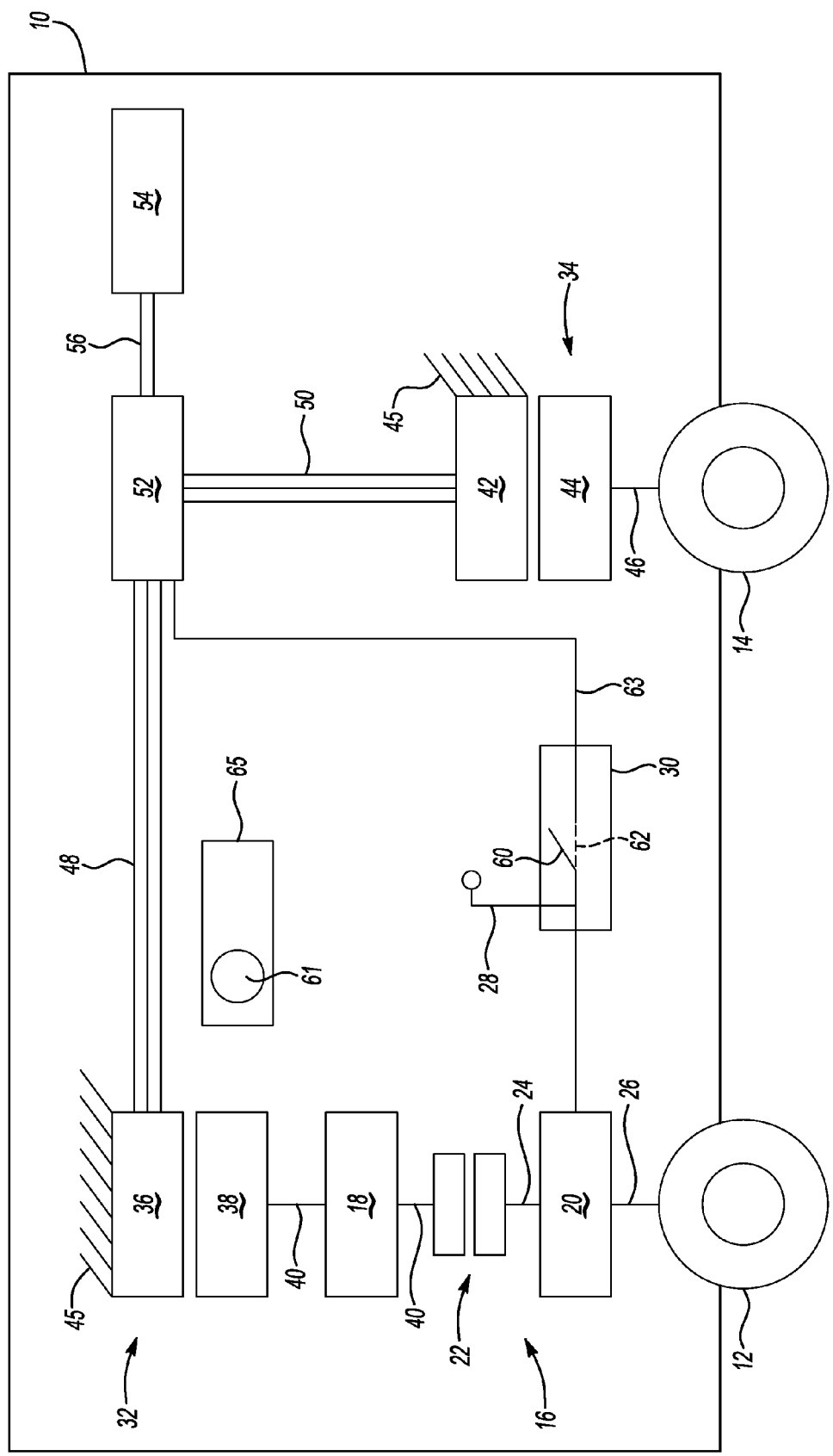
FIG. 1 is a schematic side view illustration of a vehicle with a first embodiment of a hybrid powertrain and an electric propulsion shift selector and shift indicator.

Referring to the drawings, wherein like reference numbers refer to like components, FIG. 1 shows a vehicle 10. The vehicle 10 has a pair of wheels 12 and a pair of wheels 14, only one of each of which is shown in the side view. The wheels 12 may be the front or the rear wheels, and the wheels 14 may be the other of the front or the rear wheels.

The vehicle 10 has a hybrid powertrain 16 that is arranged to allow an operator-selected electric propulsion mode. As used herein, an "electric propulsion mode" is a mode in which torque to the vehicle wheels is provided only via an electric motor/generator. The modes provided by the powertrain 16, including the operator-selected electric propulsion mode, are described in greater detail below.

Specifically, the hybrid powertrain 16 has an engine 18 connected to a transmission 20 through a clutch 22. The transmission 20 may be a manual transmission or an automatic transmission. In the case of a manual transmission, the clutch 22 is normally engaged, and is disengaged by the vehicle operator, such as by depressing a foot pedal, to disconnect the engine 18 from the transmission 20 during shifts between transmission gear ratios. In the case of an automatic transmission, the clutch 22 is engaged or disengaged in response to controller signals sent by a transmission controller (not shown) causing hydraulic, electric, or other actuation of the clutch.

The transmission 20 has an input member 24 and an output member 26. In the embodiment shown, the transmission 20 is a manual transmission with a joy-stick like shift selector 28. Movement of the shift selector 28 to various predefined locations in a shift selector plate 30 moves shift forks within the transmission 20 to establish various gear ratios through the transmission 20, each corresponding with the selected location, or establishes a neutral state of the transmission 20. In the neutral state, torque is not transmitted from the transmission input member 24 to the transmission output member 26. The transmission 20 is also in the neutral state when the shift selector 28 is between any of the predefined locations in the shift selector plate 30 of FIG. 2, such as in a position along slot 31. In the case of an automatic transmission, there is no shift selector or shift selector plate for selection of transmission gear ratios or neutral state. Instead, the various gear ratios of the transmission 20 are automatically selected by a transmission controller in response to vehicle operating conditions. However, an operator shift selector 128 as shown in FIG. 3 would be provided to allow the operator to select the electric propulsion mode. The shift selector 128 could be in the form of a depressible button.

Figure 2:
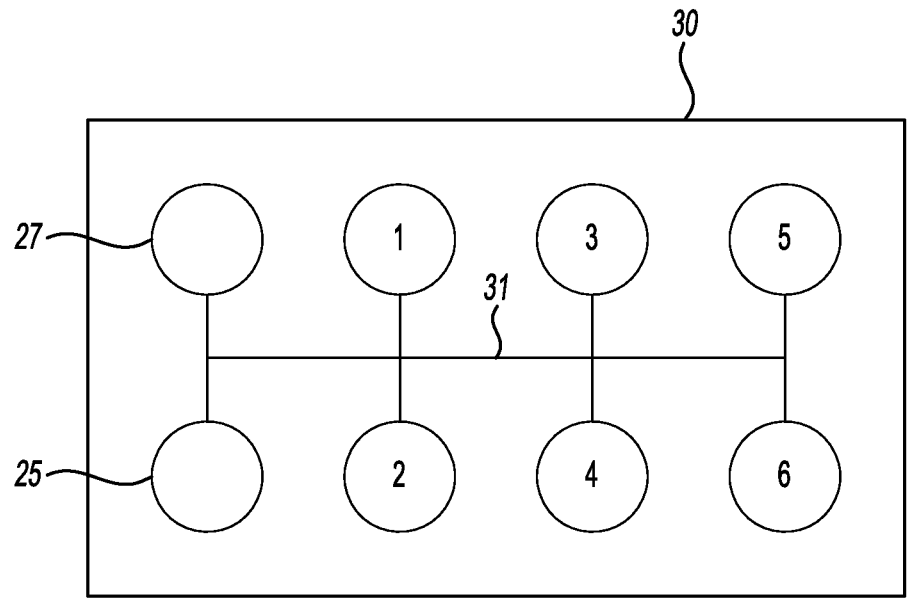
FIG. 2 is a schematic plan view illustration of the a shifting selector plate showing predefined shift positions of the shifter including the electric propulsion mode.
Figure 3:
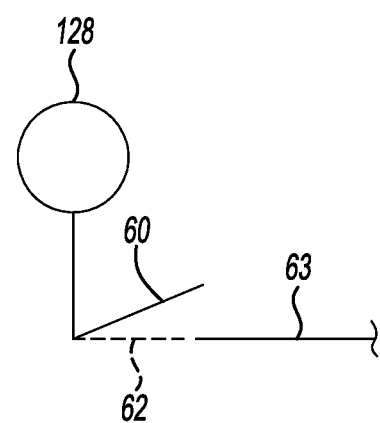
FIG. 3 is a schematic illustration of an alternative embodiment of a shift selector, such as for an automatic transmission.

FIG. 2 shows a representative shift selector plate 30 with shifter locations 1, 2, 3, 4, 5, and 6 corresponding with gear ratios that establish six forward speed ratios (1st, 2nd, 3rd, 4th, 5th, and 6th) through the transmission 20, a shifter location 25 for a reverse speed ratio and a shifter location 27 for an electric propulsion mode. The electric propulsion mode is established only when the shift selector 28 is in the location 27. The shift selector plate 30 may also be referred to as a shift grid plate. In the electric propulsion mode, the transmission 20 is in the neutral state, just as it is when the clutch 22 is disengaged and/or when the shift selector 28 is in a position 31 within the shift selector plate 30 not at one of the predefined locations 25, 27, 1, 2, 3, 4, 5, 6 of the selector plate 30.

Referring again to FIG. 1, the powertrain 16 also includes a first motor/generator 32 and a second motor/generator 34. The first motor/generator 32 has a stator 36 and a rotor 38. The rotor 38 is attached for rotation with a crankshaft 40 of the engine 18, either directly or indirectly through a gear assembly or otherwise such that rotation of the rotor 38 causes rotation of the crankshaft 40 and vice versa.

The second motor/generator 34 has a stator 42 and a rotor 44. The rotor 44 is connected via a hub 46 for rotation with wheels 14, either directly or indirectly through a gearing arrangement such that rotation of the rotor 44 causes rotation of the wheels 14.

Both of the stators 36, 42 are grounded to the same or separate stationary members 45, such as a transmission housing, and are connected by transfer conductors 48, 50 to a motor controller/power inverter 52. The motor controller/power inverter 52 is also operatively connected to an electric energy storage device such as battery 54 by transfer conductors 56. The motor controller/power inverter 52 receives control signals from an engine controller, a transmission controller, or both, and is configured to convert direct current provided from the battery 54 into alternating current provided to the stator 36 or to the stator 42, and to convert alternating current provided by the stator 36 or the stator 42 into direct current for storage in the battery 54 in response to the controller signals to establish various operating modes of the powertrain 16 as described below.

The powertrain 16 may be operated in an operator-selected electric propulsion operating mode when the operator places the shift selector 28 in the position 27 of FIG. 2 corresponding with the electric propulsion mode and which causes the transmission 20 to be in a neutral operating state. Only when the shift selector 28 is placed in the position 27 of FIG. 2, the switch 60 of FIG. 1 moves from the open position shown to a closed position 62 indicated in phantom to provide a signal along transfer conductor 63 to the motor controller/power inverter 52 indicative of an operator-commanded electric propulsion mode. The motor controller/power inverter 52 provides electric power from the battery 54 to the stator 42 to operate the motor/generator 34 as a motor. The motor/generator 32 is off, as is the engine 18. The engine 18 is disconnected from the wheels 12 as the transmission 20 is in the neutral state. In this mode, the wheels 14 are driven and the wheels 12 are coasting.

If the vehicle 10 is slowed, the motor/generator 34 may be controlled to function as a generator, providing regenerative braking at the wheels 14, with the transmission 20 still in a neutral state according to the operator-selected electric propulsion mode. If the transmission 20 is an automatic transmission, in lieu of a shift selector 28 with a predetermined location for establishing the neutral state of the transmission 20 required for the electric propulsion mode, the depressible button 128 of FIG. 3 would be provided. When depressed, the button 128 closes switch 60 of FIG. 1 to establish the closed position 62, with a signal provided along transfer conductor 63 to the motor controller/power inverter 52 of FIG. 1 to thereby indicate that the electric propulsion mode is desired. A transmission controller (not shown) would then place the transmission 20 in a neutral state.

If the state-of-charge of the battery 54 falls below a predetermined minimum during the operator-selected electric propulsion mode, the motor controller/power inverter 52 communicates with the engine controller to start the engine 18. The motor/generator 32 may be operated as a motor to start the engine 18. Once started, the engine 18 provides mechanical power to the motor/generator 32, which functions as a generator to assist the battery 54 with powering the motor/generator 34 to function as a motor. This establishes a hybrid series electric propulsion operating mode, with torque to the wheels 14 still provided only by electric power from the motor/generator 34, according to the operator-selected electric propulsion operating mode.

Operating conditions may indicate that more torque is required at the wheels 14 than is available from the motor/generator 34 in the hybrid series electric propulsion operating mode. In that case, an optional shift indicator 61 alerts the vehicle operator that a shift of the transmission 20 from the neutral state to one of the gear ratios (i.e., one of the gear ratios established at shifter locations 1, 2, 3, 4, 5, and 6) is necessary, so that the engine 18 may provide torque to wheels 12 as well. Alternatively, no shift indicator may be provided, and the vehicle operator may rely on viewing a tachometer or simply hearing the engine come on as an indicator that movement of the shift selector 28 to one of the shifter locations 1, 2, 3, 4, 5, and 6 is necessary. The shift indicator 61 may be a light on a dashboard 65 of the vehicle 10, on the shift selector plate 30, or elsewhere, or may be an audible sound, or another indicating signal to the operator. If the transmission 20 is a manual transmission, then the operator must shift the transmission 20 into an appropriate gear by placing the shift selector 28 into one of the predetermined locations of FIG. 2:

location 25 (if moving in reverse) or location 1, 2, 3, 4, 5 or 6. If the transmission 20 is an automatic transmission, the shift will be carried out automatically by the transmission controller and the clutches (not shown, but understood to those skilled in the art) of the transmission 20.

With the transmission 20 establishing one of the gear ratios reverse, 1st, 2nd, 3rd, 4th, 5th or 6th, the powertrain 16 may be controlled to establish four different operating modes corresponding with different vehicle operating conditions. For example, a parallel operating mode is established with the engine 18 on, the motor/generator 32 controlled to function as a motor to add torque to the crankshaft 40 to drive the wheels 12, and with the motor/generator 34 not powered so that the rotor 44 spins freely due to rotation of the wheels 14.

If additional tractive torque is required during the parallel operating mode, the motor controller/power inverter 52 can control the motor/generator 34 to function as a motor so that wheels 14 are driven by the motor/generator 34 while the wheels 12 are driven by the engine 18 and the motor/generator 32. This may be referred to as a full-on operating mode as all sources of tractive torque are contributing.

The engine controller and the motor controller/power inverter 52 can establish an electric all-wheel drive operating mode when the transmission 20 is in a selected gear (reverse, 1st, 2nd, 3rd, 4th, 5th, or 6th), the engine 18 is on, the motor/generator 34 is controlled to function as a motor, and the motor/generator 32 is controlled to function as a generator. With the motor/generator 32 functioning as a generator, the driven wheels 12 can slip. With the motor/generator 32 functioning as a generator, when the driven wheels 12 slip, power from the engine 18 can be delivered to the road through driven wheels 14. The slipping of the driven wheels 12 can be taken by the motor controller/power inverter 52 as an alternative signal (i.e., an alternative to the shift indicator 61 that propulsion is desired from the second motor/generator 34). Thus, the second motor/generator 34 provides propulsion only when signaled, whether by the shift selector 61 or by wheel slip.

When the transmission 20 is in any of the selected gears that establish a gear ratio through the transmission 20 (i.e., not in a neutral state and not in the operator selected electric propulsion operating mode), the powertrain 16 can be controlled to operate in a regenerative braking mode during vehicle braking. In this mode, fuel to the engine 18 is cut off so that the engine 18 coasts while the motor/generator 32 functions as a generator to slow the crankshaft 40 and thereby slow the wheels 12. The motor/generator 34 is also controlled to function as a generator in this operating mode.

The powertrain 16 can also be controlled to operate in a coasting mode when the transmission 20 is in a neutral state. Fuel to the engine 18 is cut-off and the first motor/generator 32 is controlled to operate as a motor, in which case the engine 18 coasts, or the first motor/generator 32 may be off, in which case the engine 18 is also off (i.e., not spinning). The motor/generator 34 is not powered either as a motor or as a generator, and also coasts, as would the wheels 14.

Figure 4:
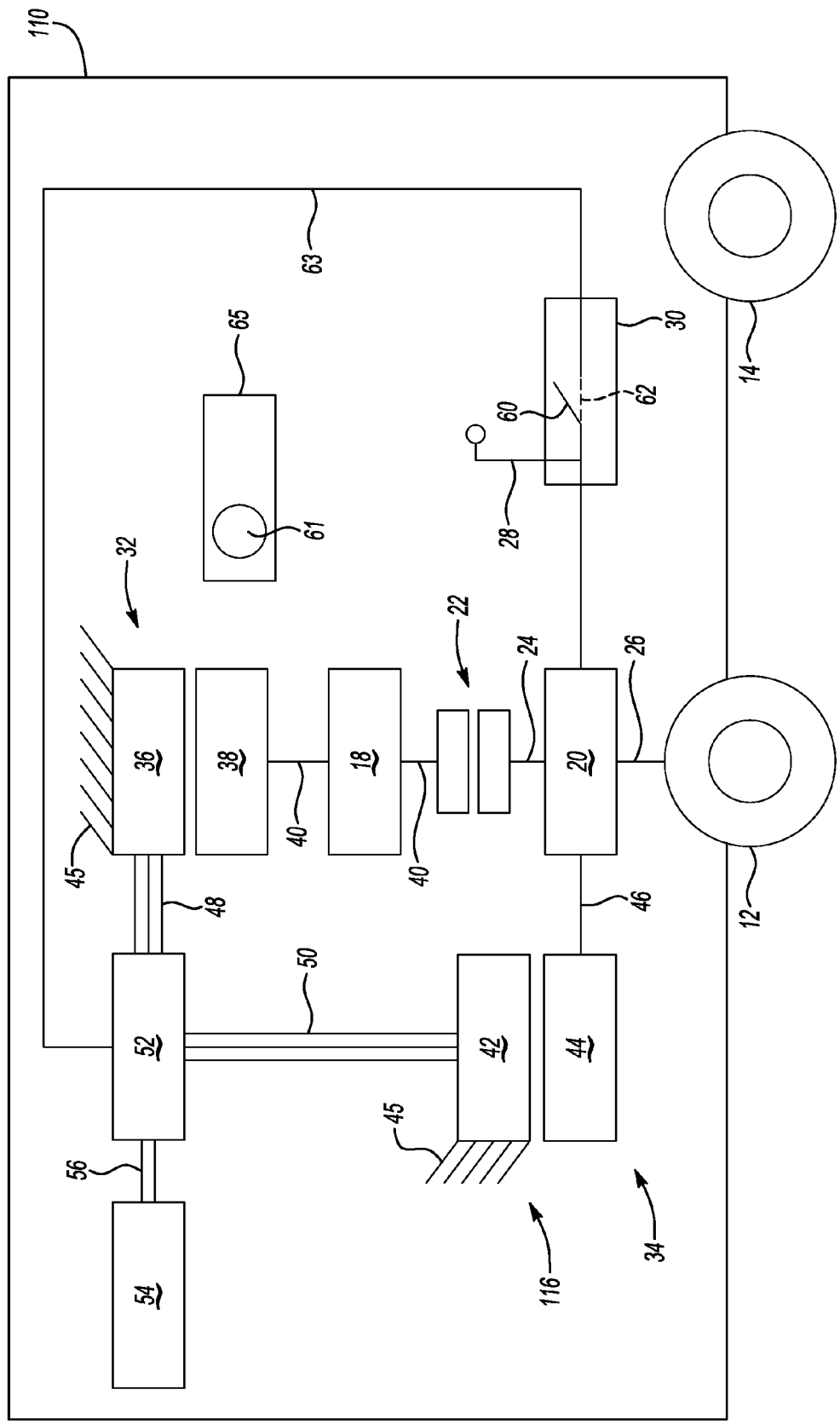
FIG. 4 is a schematic side view illustration of a vehicle with a second embodiment of a hybrid powertrain and an electric propulsion shift selector and shift indicator.

Referring to FIG. 4, another embodiment of a vehicle 110 is shown with a powertrain 116 configured to establish an operator-selected electric propulsion mode. Components substantially identical to those in FIG. 1 are referred to with the same reference numbers. In this embodiment, the second motor/generator 34 is operatively connected to provide torque to the same wheels 12 as is the engine 18. The motor/generator 34 is connected via a hub 46 that provides torque to the wheels 12 through the output 26 of the transmission 20, and operates to provide torque to the output member 26 even when the transmission 20 is in a neutral state in which torque is not provided from the input member 24 to the output member 26.

When an operator selects the electric propulsion mode by moving the shift selector 28 to the position 27 of FIG. 2 (or by depressing the button 128 of FIG. 3 to close switch 60 in the case of an automatic transmission), the transmission 20 is in a neutral state, disconnecting the engine 18 from the wheels 12, and the motor controller/power inverter 52 controls the motor/generator 34 to operate as a motor using energy stored in the battery 54 to provide torque to the wheels 12. The engine 18 is off and the motor/generator 32 is off. The electric propulsion mode can be selected to launch the vehicle 110.

If the state-of-charge of the battery 54 falls below a predetermined minimum during the operator-selected electric propulsion mode, the motor controller/power inverter 52 communicates with the engine controller to start the engine 18. The motor/generator 32 may be operated as a motor to start the engine 18. Once started, the engine 18 provides mechanical power to the motor/generator 32, which functions as a generator to assist the battery 54 with powering the motor/generator 34 to function as a motor, establishing a hybrid series operating mode, with torque to the wheels 12 still provided only by electric power from the motor/generator 34, according to the operator-selected electric propulsion operating mode.

If the transmission 20 is shifted to establish one of the gear ratios reverse, 1st, 2nd, 3rd, 4th, 5th, or 6th, either by an operator shifting in response to a shift indicator 61 or otherwise (such as in response to wheel slip), the powertrain 16 may be controlled to establish four different operating modes corresponding with vehicle operating conditions. For example, the hybrid parallel operating mode is established with the engine 18 on, the motor/generator 32 controlled to function as a motor to add torque to the crankshaft 40 to drive the wheels 12, and with the motor/generator 34 not powered.

If additional tractive torque is required during the parallel operating mode, the motor controller/power inverter 52 can control the motor/generator 34 to function as a motor so that the wheels 12 are driven by the engine 18, the motor/generator 32, and the motor/generator 34, which may be referred to as a full-on operating mode as all sources of tractive torque are contributing.

When the transmission 20 is in any of the selected gears that establish a gear ratio through the transmission 20 (i.e., not in a neutral state and not in the operator selected electric propulsion operating mode), the powertrain 116 can be controlled to operate in a regenerative braking mode during vehicle braking. In this mode, the engine 18 is controlled to coast by cutting off fuel to the engine, while the motor/generator 32 functions as a generator to slow the crankshaft 40 and thereby slow the wheels 12. The motor/generator 34 is also controlled to function as a generator in this operating mode.

The powertrain 116 can also be controlled to operate in a coasting mode when the transmission 20 is in a neutral state but is not in the operator-selected electronic propulsion mode. Fuel to the engine 18 is cut-off and the first motor/generator 32 is controlled to operate as a motor, in which case the engine 18 would coast. Alternatively, the first motor/generator 32 may be off, in which case the engine 18 would also be off (i.e., not spinning). The motor/generator 34 would not be powered either as a motor or as a generator, and would also coast, as would the wheels 12, 14.

In the powertrains 16, 116 of FIGS. 1 and 4, the motor/generators 32, 34 are arranged so that a conventional, non-hybrid powertrain with a manual or automatic transmission 20 and engine 18 could be converted into a hybrid powertrain by adding the motor/generators 32, 34 with comparatively little redesign.

While the best modes for carrying out the invention have been described in detail, those familiar with the art to which this invention relates will recognize various alternative designs and embodiments for practicing the invention within the scope of the appended claims.

The invention claimed is:

1. A powertrain for a vehicle with wheels comprising:
an engine;
a multi-speed transmission having an input member operatively connected to the engine and an output member operatively connected to the wheels and having multiple gear ratios between the input member and the output member and a neutral state in which torque is not transmitted from the input member to the output member;
a first motor/generator powered by the engine to function as a generator;
an electric energy storage device operable to receive electric power from the first motor/generator;
a second motor/generator configured to receive power from either or both of the electric energy storage device and first motor/generator to function as a motor to provide propulsion power to the wheels; and
an operator shift selector movable to an electric propulsion position that establishes an electric propulsion mode in which the second motor/generator functions as a motor to provide propulsion power to the wheels and in which the transmission is in the neutral state.

2. The powertrain of claim 1, further comprising:
a shift indicator operable to provide an output indicative of operating conditions requiring a shift of the transmission from the neutral state to one of the gear ratios.

3. The powertrain of claim 1, further comprising a motor controller operable to control the first and the second motor/generators; and wherein the motor controller controls the second motor/generator to function as a motor in response to slipping of the wheels.

4. The powertrain of claim 3, wherein the second motor/generator is controlled to operate as a motor only in response to slipping of the wheels or when required by one of the gear ratios selected by the shift selector.

5. The powertrain of claim 1, wherein the transmission is a manual transmission; and wherein the operator shift selector is a gear shifter that establishes each of the gear ratios when placed in different predetermined positions for each of the gear ratios; and wherein the electric propulsion position is different from any of the predetermined positions for each of the gear ratios.

6. The powertrain of claim 1, wherein the operator shift selector is a depressible button.

7. The powertrain of claim 1, further comprising:
a motor controller/power inverter;
a switch configured to be closed by the operator shift selector when the operator shift selector is in the electric propulsion position to operatively connect the operator shift selector with the motor controller/power inverter.

8. The powertrain of claim 1, wherein the second motor/generator is operable as a motor to launch the vehicle when the operator shift selector is placed in the electric propulsion position.

9. The powertrain of claim 1, wherein the powertrain is operable in a series hybrid mode when the operator shift selector is placed in the electric propulsion position with the engine on and powering the first motor/generator to operate as a generator, and the first motor/generator providing electric power to the second motor/generator.

10. The powertrain of claim 1, wherein the first motor/generator is operable as a motor to start the engine.

11. The powertrain of claim 1, wherein the second motor/generator is operable as a generator during vehicle deceleration.

12. A powertrain for a vehicle with wheels comprising:
an engine;
a transmission having an input member and an output member and operable to provide a plurality of gear ratios between the input member and the output member;
wherein the transmission is one of an automatic transmission and a manual transmission;
a selectively disengageable clutch between the engine and the input member; wherein the transmission has a neutral state in which torque is not transmitted from the input member to the output member;
a first motor/generator having a rotor connected directly or indirectly with the engine regardless of whether the clutch is engaged or disengaged;
a second motor/generator having a rotor connected directly or indirectly with some of the wheels; wherein the first motor/generator is selectively operable as a generator when powered by the engine to provide electric power to the second motor/generator;
an electric energy storage device; wherein the second motor/generator is selectively operable as a motor when receiving electric power from the electric energy storage device or from the first motor/generator;
a motor controller operable to cause each of the first and the second motor/generators to function either as a motor or as a generator;
an operator shift selector movable to an electronic propulsion position that places the powertrain in an electric propulsion mode in which the second motor/generator functions as a motor to provide propulsion power to said some of the wheels and in which the transmission is in the neutral state; and
a shift indicator operatively connected to the motor controller and operable to provide an output signal indicative of a direction to shift the transmission to one of said gear ratios.

13. The powertrain of claim 12, wherein the second motor/generator is operable as a motor to launch the vehicle when the operator shift selector is placed in the electric propulsion position.

14. The powertrain of claim 12, wherein the powertrain is operable in a hybrid series mode with the engine on and powering the first motor/generator to operate as a generator, and the first motor/generator providing electric power to the second motor/generator.

15. The powertrain of claim 12, wherein the first motor/generator is operable as a motor to start the engine.

16. The powertrain of claim 12, wherein the second motor/generator is operable as a generator during vehicle deceleration.

17. A powertrain operable to propel a vehicle with wheels comprising:
an engine;
a selectively engageable clutch;
a transmission connecting the engine with the vehicle wheels when the selectively engageable clutch is engaged, and having multiple gear ratios and a neutral state in which engine power is not transmitted to the wheels through the transmission;

a first motor/generator coupled directly or indirectly to the wheels when the selectively engageable clutch is engaged and operable to start the engine, generate electricity, and assist the engine in providing propulsion torque;

a second motor/generator coupled to the front or the rear wheels either directly or indirectly through the transmission and configured to receive power from the battery, the first motor/generator, or both to operate as a motor providing vehicle propulsion;

a controller connected to the motor/generators and operable to control each of the motor/generators to function as a motor or as a generator in response to vehicle operating conditions; and an operator shift selector selectively movable to place the transmission in the neutral state so that the engine is mechanically separated from the wheels and to cause the controller to operate the second motor/generator as a motor to provide torque at the vehicle wheels to propel the vehicle, thereby establishing an electric propulsion mode.

18. The powertrain of claim 17, further comprising:
a shift indicator operable to indicate when operating conditions warrant a shift to one of the gear ratios to permit the engine to provide torque to the wheels through the transmission.

19. The powertrain of claim 16, wherein the first motor/generator and the second motor/generator are operable to provide a series operating mode in which the engine provides mechanical power to the first motor/generator to function as a generator, and the first motor/generator provides electric power to the second motor/generator to function as a motor to provide torque to the wheels; and wherein the controller controls the motor/generators to establish the series operating mode when the operator shift selector places the transmission in the neutral state and the electric storage device is below a predetermined state of charge.

20. The powertrain of claim 1, further comprising:
a selectively disengageable clutch between the engine and the input member; and wherein the first motor/generator is mechanically disconnected from the transmission when the clutch is disengaged.

\* \* \* \* \*